No. 781,502. Patented January 31, 1905.

UNITED STATES PATENT OFFICE.

CHARLES L. DOWELL, OF SOUTH BEND, INDIANA, ASSIGNOR TO THE GLOBE COAL MFG. CO., OF SOUTH BEND, INDIANA, A CORPORATION OF INDIANA.

COMPOSITION FOR ARTIFICIAL FUEL.

SPECIFICATION forming part of Letters Patent No. 781,502, dated January 31, 1905.

Application filed April 26, 1904. Serial No. 205,005.

*To all whom it may concern:*

Be it known that I, CHARLES L. DOWELL, a citizen of the United States, residing at South Bend, in the county of St. Joseph and State of Indiana, have invented a certain new and useful Composition for Artificial Fuel; and I do hereby declare the following to be a full, clear, and exact description of the invention, such as will enable others skilled in the art to which it appertains to make and use the same.

The object of the present invention is to produce an artificial fuel which will be highly combustible and smokeless and which eliminates the fusion of cinders.

My composition consists of the following ingredients, combined in about the proportions stated: bicarbonate of soda, ten pounds; sulfate of soda, six pounds; rosin, twenty pounds; saltpeter, twelve pounds; common salt, twenty pounds; slaked lime, twenty-six pounds; peat, muck, or other decomposed vegetable soil, nine thousand four hundred pounds. The bicarbonate of soda, sulfate of soda, rosin, saltpeter, salt, and slaked lime are first thoroughly ground and mixed. The composition is then mixed with the peat in about the proportion of twenty pounds to two thousand pounds of peat. The mixture is then worked into briquets under pressure.

The bicarbonate of soda increases the combustion, and thus adds flame to the fuel, and when combined with saltpeter, which also promotes and prolongs combustion, gives off pure oxygen, making a very hot and bright flame. The sulfate of soda prevents the fusion of cinders, and with the salt it eliminates smoke and soot. The rosin acts as a combustible and a binder, emitting hot gas and flame. The saltpeter, as has been explained, prolongs the combustion to a remarkable degree, and with the sodiums prevents the fusion of cinders and assists the salt in eliminating smoke and soot. The salt produces a smokeless and sootless fuel. The slaked lime acts as a binder, serves to set and harden the fuel, prevents the fusion of cinder, liberates the hydrogen, and resists moisture.

The various ingredients compounded in the proportions stated serve as a binder, carbonizer, and smoke preventive. The fuel burns readily and with an intense heat.

What I claim, and desire to secure by Letters Patent, is—

1. An artificial fuel consisting of bicarbonate of soda, sulfate of soda, rosin, saltpeter, common salt, slaked lime and peat.

2. The process of making artificial fuel, consisting in thoroughly grinding and mixing bicarbonate of soda, sulfate of soda, rosin, saltpeter, common salt and lime, in about the proportion stated, then mixing the resulting composition with peat or other decomposed vegetable soil, and working the mass into briquets, substantially as set forth.

3. The herein-described composition of matter for the manufacture of artificial fuel, consisting of bicarbonate of soda ten pounds, sulfate of soda six pounds, rosin twenty pounds, saltpeter twelve pounds, common salt twenty pounds, and lime twenty-five pounds, substantially as described.

In testimony whereof I affix my signature in presence of two witnesses.

CHARLES L. DOWELL.

Witnesses:
  GEORGE ALTSEL,
  ORALE HESS.